United States Patent
Shepherd et al.

(10) Patent No.: US 8,051,029 B2
(45) Date of Patent: Nov. 1, 2011

(54) SEMANTICALLY VALIDATING PRINT PRODUCT DEFINITIONS

(75) Inventors: Michael D. Shepherd, Ontario, NY (US); Kirk J. Ocke, Ontario, NY (US); Dale E. Gaucas, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 924 days.

(21) Appl. No.: 12/034,762

(22) Filed: Feb. 21, 2008

(65) Prior Publication Data
US 2009/0216703 A1 Aug. 27, 2009

(51) Int. Cl.
*G06N 5/02* (2006.01)
*G06F 17/00* (2006.01)
(52) U.S. Cl. ............................... 706/50; 700/94; 360/75
(58) Field of Classification Search ..................... 706/50
See application file for complete search history.

(56) References Cited

U.S. PATENT DOCUMENTS

| | | |
|---|---|---|
| 2006/0004746 A1* | 1/2006 | Angus et al. ................. 707/4 |
| 2006/0242002 A1 | 10/2006 | Sun et al. |
| 2007/0094200 A1 | 4/2007 | Ocke |
| 2009/0089174 A1* | 4/2009 | Brunner et al. ............... 705/26 |
| 2009/0141302 A1* | 6/2009 | Balm et al. ................. 358/1.15 |

* cited by examiner

*Primary Examiner* — Omar Fernandez Rivas
(74) *Attorney, Agent, or Firm* — Gibb I.P. Law Firm, LLC

(57) ABSTRACT

A method provides a knowledgebase having a set of existing print product classes into which print product descriptions are classified. The method receives the new print product class from a user and maps the representation of new print product class conditions to be semantically consistent with the representation of existing class conditions. The method evaluates the new print product class to produce user feedback. The user feedback is output to the user. The new print product class is added to the knowledgebase only if the new print product class is valid and free of errors and semantically consistent with the definitions of already existing print product classes.

20 Claims, 3 Drawing Sheets

SEMANTICALLY VALIDATING PRINT PRODUCT DEFINITIONS

CROSS-REFERENCE TO RELATED APPLICATIONS

This application is related to U.S. patent application Ser. No. 11/901,895 filed on Sep. 18, 2007, entitled "Method And System For Automatically Adding New Class Definitions To A Classification System, having the complete disclosure of which, in its entirety, is herein incorporated by reference.

BACKGROUND AND SUMMARY

Embodiments herein generally relate to incorporating new product types (classes) into an existing workflow system, and more particularly to a system and method that use semantics to validate user added product types so that the new product types will be consistent and not conflict with existing product types.

In existing workflow systems, product descriptions (e.g., JDF® Product Intent) are automatically classified into a product type or product class (e.g., Business Card) using a rules-based system. As workflow systems become more dynamically configurable, the addition of new product types and the rules to classify product descriptions into new product types provides for increased sophistication and complexity of the classifier.

For example, as described in U.S. Patent Publication 2006/0242002, the complete disclosure of which is incorporated herein by reference, the JDF® (Job Definition Format) is an industry standard designed to simplify information exchange between different applications and systems in and around the graphic arts industry. JDF® is a registered trademark of the International Cooperation for the Integration of Processes in Prepress, Press and Postpress Organization (CIP4) Zurich, Switzerland and specifies the information required to complete a customer intended print job. JDF® enables the integration of commercial and planning applications into the technical workflow. JDF® is a comprehensive XML-based (extensible markup language-based) file format industry standard for end-to-end job ticket specifications combined with a message description standard and message interchange protocol.

Generally, the information in JDF® is organized into nodes in a hierarchical tree of print-related processes and resources that each process produces and consumes. An XML-based JDF® job describes the status of processes and resources at a particular instance. An MIS (Management Information System) is responsible for estimating, tracking, controlling and monitoring the entire production workflow.

Thus, JDF® allows XML-based description of all the processes needed to complete a print product, from job submission through prepress, press and post press. Each process is defined in terms of the consumed input resources and produced output resources. Resources produced by one process might be required by other processes, and processes are interconnected in a chain of processes to form a complete workflow. Processes may share resources and be interconnected in sequential, parallel, overlapping and iteration fashions.

The embodiments herein can use an application, such as JDF®, within any apparatus, such as a copier, multifunction machine, printer, or other printing apparatus. Such a printing apparatus includes interconnected items such as a printing device (or printing engine), a processor, a storage device, etc. The storage device is adapted to maintain a knowledgebase having a set of defined product types or classes (such as print product types or classes) into which product descriptions (e.g., print product descriptions) are classified, wherein each defined print product type or class is comprised of existing type or class conditions. The conditions describe the print products, which are associated with templates that are used to create a workflow for producing a print product instance (the actual printed output).

In addition, an apparatus according to embodiments herein includes some form of user interface, such as a graphic user interface that is adapted to receive a new type or class (such as a new print product type or class) that is created by the user. For purposes herein, a "new type or class" is one that is not previously within the set of existing defined print product types that are in the knowledgebase. The new print product type similarly is defined with print product type conditions. Further, the embodiments herein include a mapper that is adapted to map the vocabulary of knowledge such that the representation of newly defined print product type conditions are semantically consistent with the representation of existing type conditions that may be expressed in a different vocabulary.

Embodiments herein use an evaluator to evaluate the new print product type to produce user feedback. More specifically, the evaluator is adapted to perform actions such as identifying ones of the existing print product types that overlap the new print product type, identifying the new print product type conditions that are inconsistent with associated existing conditions, identifying mutually exclusive conditions within the new print product type conditions, validating the new print product type conditions with respect to capabilities of print products, services and devices that will be used to physically produce the new print product type, identifying whether the new print product type is valid and free of errors, etc. The processor can incorporate the new print product type into the knowledgebase as one of the existing print product types if the new print product type is valid and free of errors, thereby preventing inappropriate new product types from being incorporated to the knowledgebase.

The graphic user interface or printing apparatus is used to output this user feedback. If the existing print product types overlap the new print product type, the graphic user interface is further adapted to request input from the user regarding which overlapping print product type has precedence. Also, when receiving the new print product type, the graphic user interface will restrict the new print product type conditions to a predefined vocabulary.

A method embodiment herein uses such an apparatus to first provide the knowledgebase having the set of existing print product types into which the print product descriptions are classified. The method receives the new print product type from the user and maps the representation of new print product type conditions to be semantically consistent with the representation of existing type conditions.

The method also evaluates the new print product type to produce user feedback. This evaluation process includes identifying those of the existing print product types that overlap the new print product type, identifying the new print product type conditions that are inconsistent with existing conditions within an associated existing print product type, identifying mutually exclusive conditions within the new print product type conditions, validating the new print product type conditions with respect to capabilities of print products, services and devices that will be used to physically produce the new print product type, identifying whether the new print product type is valid and free of errors, etc. The user feedback is output to the user. Once again, the new print product type can be incorporated into the knowledgebase as one of the existing print product types if the new print product type is valid and free of errors.

Also, if the existing print product types overlap the new print product type, the method requests input from the user regarding which overlapping print product type has precedence. When receiving the new print product type, the method restricts the new print product type conditions to those within the predefined vocabulary of the knowledgebase.

The existing conditions comprise definitions of the product descriptions which are associated with workflow templates to create a workflow for producing a product instance. Also, the print product descriptions are classified within the types based on semantic matches between the print product descriptions and the existing type conditions.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As discussed above, embodiments herein incorporate new product types (classes) into an existing workflow system, and use semantics to validate user added product types so that the new product types will be consistent and not conflict with existing product types. Thus, the embodiments herein provide a system and method that automatically validates and checks the consistency of defined print products of a print shop that are used in a classification system. This is accomplished through the use of semantic technologies and automated reasoning on the definitions of the print products.

As mentioned above, the JDF® Intent2Process conversion system is a rules-based system that automatically transforms JDF® Product Intent (a product description) into a process network (workflow) that can be used to manufacture the desired product. For example, a JDF® Product Intent representing a "business card" can be automatically transformed into an imposition process followed by a print process that can be executed to manufacture the business cards. One advance in this area of technology is that such applications may be configured on-site at a customer print shop with new user added print product types and rules for defining those product types.

In addition, progresses in Web related technologies have brought about more advances, which provide for improved automated processing of computing resources, including the capability to act on metadata and semantic representations. Knowledgebases are created to include taxonomies (classes & properties), logical assertions, instances of defined classes, and datatype expressions in which automated reasoning systems use description logic to infer new and expanded knowledge from the provided conditions and assertions. For example, one open-source reasoner, Pellet® available from Clark & Parsia, LLC, Washington, D.C., U.S.A., is a commonly used inferencing engine.

Figure 1:
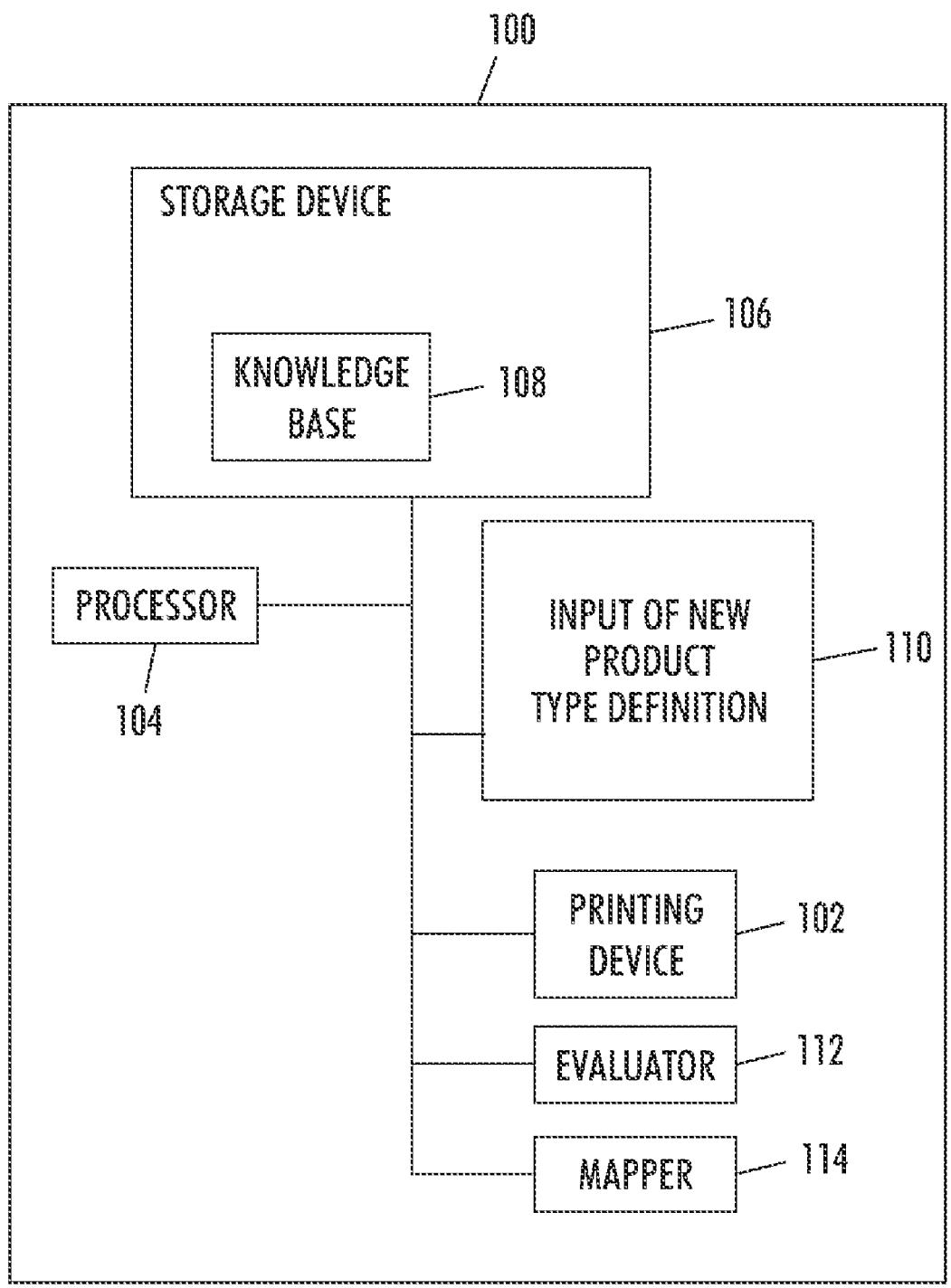
FIG. 1 is a schematic diagram illustrating embodiments herein.

As shown in FIG. 1, embodiments herein can use an application, such as JDF®, and Pellet® within any apparatus, such as a copier, multifunction machine, printer, or other similar apparatus 100. Such a printing apparatus 100 includes interconnected items such as a printing device 102 (or printing engine), a processor 104, a storage device 106, etc.

The storage device 106 is adapted to maintain a knowledgebase 108 having a set of existing defined product types or classes (such as print product types or classes) into which product descriptions (e.g., print product descriptions) are classified. Within the knowledgebase 108, the existing conditions comprise definitions of the product descriptions which are associated with workflow templates to create a workflow for producing a product instance. Also, the product descriptions are classified within the types based on semantic matches between the product descriptions and the existing type conditions. Product description formats, such as JDF® (mentioned above) product intent nodes are intended to formalize the description of a product to make translation to a workflow easier.

Each existing print product type or class comprises existing type or class conditions. In some workflow related embodiments, these conditions comprise templates and the print product descriptions are transformed via the templates to create workflows for the different processes needed to actually produce an item, such as a print product instance (the actual printed output).

In addition, embodiments herein use some form of input of new product type definition 110, such as a graphic user interface that is adapted to receive a new type or class (such as a new print product type or class) that is created by the user, or an application which automatically discerns new type or class (see Method and System for Automatically Adding New Class Definitions to a Classification System, (U.S. patent application No.), mentioned above. For purposes herein, a "new type or class" is one that is not previously within the set of existing print product types that are in the knowledgebase 108. The new print product type similarly has new print product type conditions. Further, the embodiments herein include a mapper 114 that is adapted to map the representation of new print product type conditions to be semantically consistent with the representation of existing type conditions. For instance, the print product type condition of "comb binding" may be represented by the user graphically using a document visualization application, which is then mapped into a knowledge base semantic representation to perform automated reasoning among all print product types.

Embodiments herein also use an evaluator 112 to evaluate the new print product type and to produce user feedback. The evaluator 112 and evaluator 114 can comprise software modules, or hardware modules that perform logic operations through the use of transistors, comparators, and Boolean hardware devices such as AND gates, OR gates, NOT gates, etc. After the new product type is preliminarily added to the knowledgebase 108, the evaluator 112 evaluates this new product type relative to the existing items within the knowledgebase 108.

Thus, the evaluator 112 perform actions such as identifying those of the existing print product types that overlap the new print product type, identifying the new print product type conditions that are inconsistent with existing conditions within an associated existing print product type, identifying mutually exclusive conditions within the new print product type conditions, validating the new print product type conditions with respect to capabilities of print products, services and devices that will be used to physically produce the new print product type, identifying whether the new print product type is valid and free of errors, etc.

The processor 104 can be set to incorporate the new print product type into the knowledgebase 108 as one of the existing print product types only if the new print product type is valid and free of errors, to prevent inappropriate new product types from being incorporated to the knowledgebase 108. Alternatively, the processor 104 can be set to incorporate the new print product type into the knowledgebase 108 as one of the existing print product types, at the instruction of the user. Thus, the user can be given the option to add a potentially erroneous new product type after the user has been provided feedback about the problems with the new product type they created. For example, the user may decide that the errors discussed in the feedback are minor and may decide to add the new product type despite being provided feedback relating to potential problems with the new product type.

The graphic user interface 110 or printing apparatus 100 is used to output this user feedback. If the existing print product types overlap the new print product type, the graphic user interface 110 is further adapted to request input from the user regarding which overlapping print product types has precedence. In other words, when a given product description can fall within both the new product type and within an existing product type, the user can indicate which product type should take precedence and into which product type the product description should be placed. Also, when receiving the new print product type, the graphic user interface 110 input screen and choices thereon can be restricted to a predefined vocabulary consistent with the existing vocabulary within the knowledgebase.

For example, the product type "Business Card" may consist of the following conditions: the binding of pages are loose or not specified; there are no covers specified; the finished media dimension is 2"×3.5"; the number of pages is no more than 2. These conditions are asserted a-priori into the knowledgebase 108 which is used by an automated reasoner running on the processor 104 to perform the realization (assignment of a print product instance to a type) of incoming product intent descriptions.

In the print shop, there can be a new product type for which the user would like the application to automatically produce workflows. The user configures the application by adding the new product types into the knowledgebase 108. An example new product type could be "Greeting Card". The product type is defined with certain conditions such as: the binding of pages are loose or not specified; there are no covers specified; the finished media dimension is between 3"×5" and 5.5"×8.5"; the finished product is center folded on the y-axis; and the number of pages is no more than 4.

As mentioned above, the conditions of the new product type which the user can specify are restricted to the vocabulary used to describe the print shop capabilities as represented in the knowledgebase. New product types may be added manually, as just described for Greeting Card, or may be added automatically in future systems.

Figure 2:
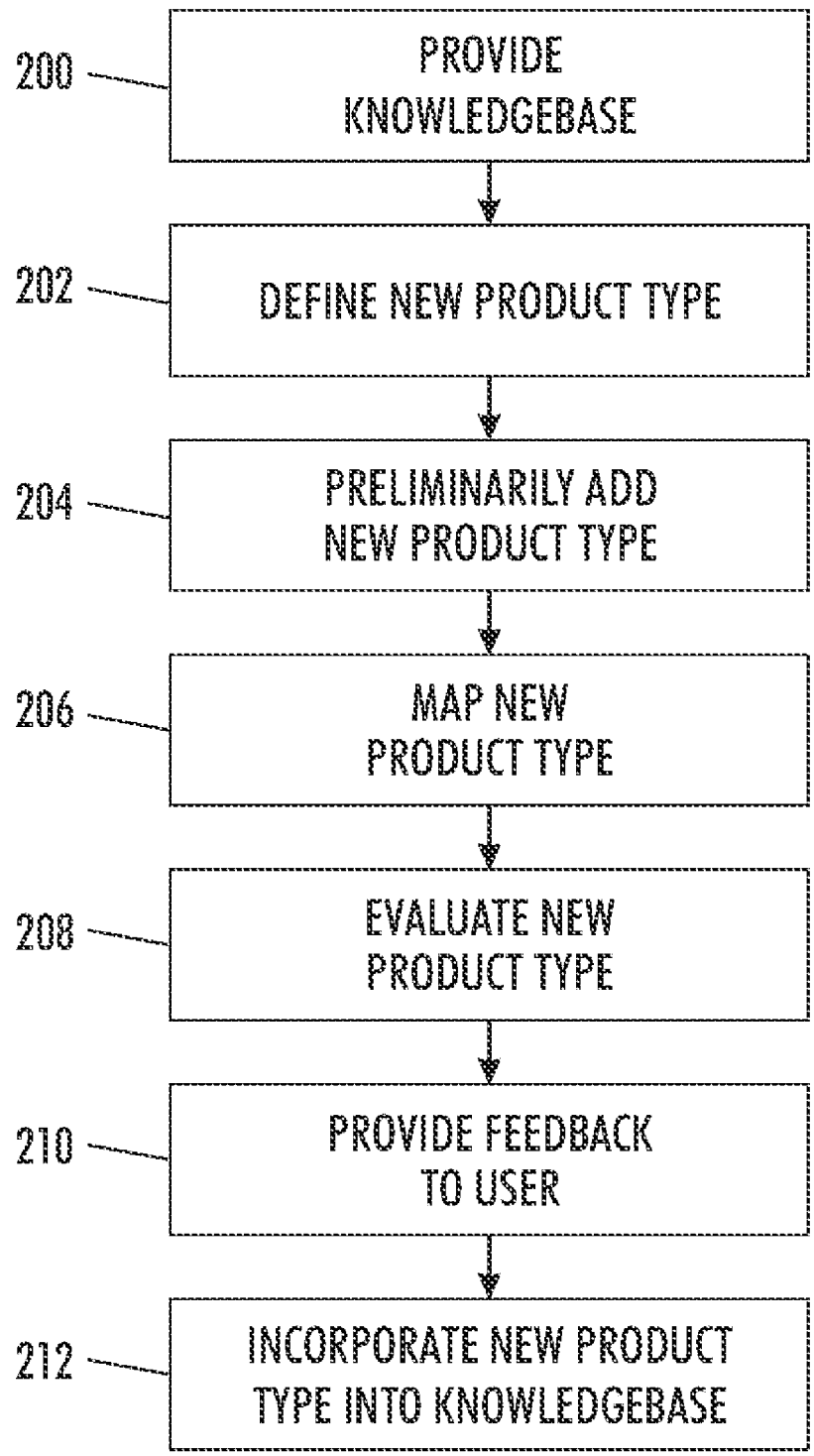
FIG. 2 is a flow diagram illustrating embodiments herein.
Figure 3:
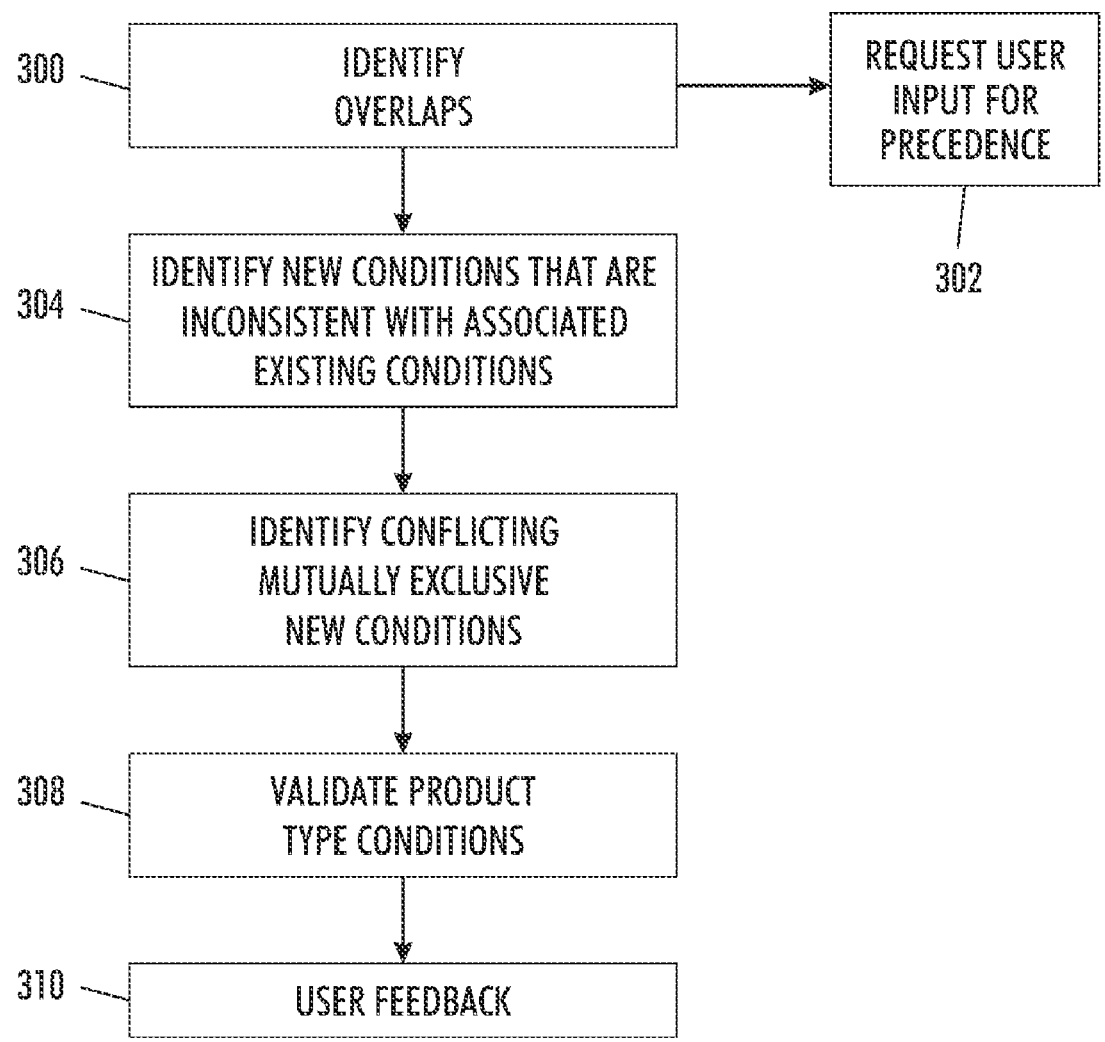
FIG. 3 is a flow diagram illustrating embodiments herein.

FIGS. 2 and 3 illustrate method embodiments herein in flowchart form. These embodiments use any apparatus (such as that discussed above) to first provide the knowledgebase (item 200). Again, the knowledgebase has the set of existing product types into which the product descriptions are classified.

The method receives the new product type from the user to define the new product type in item 202 and preliminarily adds the new product type to the knowledgebase to input the new product type definition in item 204. When receiving the new product type, the method restricts the new product type conditions to those within the predefined vocabulary of the knowledgebase. Regarding classifying a print product description in a print shop vocabulary, U.S. Patent Publication 2007/0094200, the complete disclosure of which is incorporated herein by reference, describes an approach to classifying descriptions of a print product, as provided by a customer of a print shop, into a print shop vocabulary (ontology) used for communicating between the product and process so as to translate the print product description to a workflow more effectively. Reference is made to the foregoing publication, and the details regarding incorporating new product types into knowledgebases are not discussed herein.

The method also maps the representation of new product type and conditions therein to be semantically consistent with the representation of existing type conditions in item 206. The method evaluates the new product type (item 208) to produce user feedback. This evaluation process of item 208 is shown in greater detail in FIG. 3.

Thus, after the new product type is defined by the user, its conditions are mapped by the system into the knowledgebase in a semantic form via classes, properties, assertions, etc. With the embodiments herein, the automated reasoner is then automatically run (using the processor 104) on the updated knowledgebase in order to validate the newly defined product type in the context of the existing product types.

As discussed above, the system uses the reasoner to provide feedback to the user about the updated classification system in a variety of forms. As shown in FIG. 3, the evaluation includes a process of identifying those of the existing product types that overlap the new product type, as shown in item 300. If the existing product types overlap the new product type, the method requests input from the user regarding which overlapping product type has precedence in item 302. In other words, when a given product description can fall within both the new product type and within an existing product type, item 302 has the user indicate which product type should take precedence and into which product type the product description should be placed.

Thus, product types which have equivalent or partially matching characteristics such that a single product intent instance may be classified as multiple product types are identified and reported to the user. The user would then take corrective action to provide conflict resolution parameters to each product type, such as a rule Salience value for which product type takes precedence.

For example, a Generic Card may be user-defined that has the following conditions: the binding of pages are loose or not specified; there are no covers specified; the finished media dimension is less than 4"×4"; and the number of pages is no more than 2. These conditions overlap with the previously defined "Business Card" product type such that a product intent could be classified as both Business Card and Generic Card. The method reports that multiple product types could be inferred such that the user needs to provide conflict resolution criteria.

In item 304, the method identifies the new product type conditions that are inconsistent with existing conditions within an associated existing product type. Thus, the validation process also identifies errors in user-generated rules which cause newly defined product types to result in undesired or unexpected consequences. For example, while defining the previously described "Greeting Card", the user may inadvertently add a condition to the product type that it must be Saddle Stitched instead of loose pages (no binding). The method uses the automated reasoner to infer that "Greeting Card" is not a subclass of "Card" which required loose pages (no binding). The system raises a red flag so that the user may re-evaluate their chosen conditions.

In item 306, the method also identifies conflicting mutually exclusive conditions within the new product type conditions. Thus, the validation process also detects inconsistencies among product types and their conditions. For example, the knowledgebase already has definitions for a Perfect Bound Book (binding is a soft cover) and Saddle Stitched Booklet (binding is saddle stitching) which are explicitly set to be disjoint—meaning that any print product instance could never be classified as both product types. A user may define a new product type which specifies both a soft cover and saddle stitching. The automated reasoner would detect that the new product type could be subclassed from both Perfect Bound Book and Saddle Stitched Booklet, which is an inconsistency because of the initial assertion that they are disjoint classes. The system would notify the user that the inconsistency exists and must be corrected.

In item 308, the method validates the new product type conditions with respect to capabilities of products, services and devices that will be used to physically produce the new product type, identifying whether the new product type is valid and free of errors, etc. Thus, the validation process also validates characteristics against simple capabilities of products, services, and devices. For example, the capability of a specific cutter to cut press sheets to certain sizes can be asserted into the knowledgebase where the trim sizes are represented as a class of finished media dimensions. A class of DC-535 Cutter Trim Sizes would be defined as 6"×4" to 12.6"×18". The user may desire that all product types requiring cutting conform to these capabilities. If a "Business Card" product type is defined as described above, the method would use the automated reasoner to infer that the finished dimensions of the Business Card (2"×3.5") is not a match (disjoint) for the DC-535 trim sizes. The system would notify the user that Business Cards could not be cut with the desired cutter.

In addition, other inconsistencies may be detected and reported as other conditions are modeled. If none of the above inconsistencies are found, the method reports a fully-consistent and valid knowledgebase of product types, and the system then notifies the user that the product type classifier has no detected problems. Thus, the information obtained during the evaluation process shown in FIG. 3 is provided to the user as user feedback in item 310. As shown in item 210, this feedback is output to the user.

In item 212, the new print product type is incorporated (potentially permanently) into the knowledgebase as one of the existing print product types (e.g., the preliminarily added new product type (item 204) is not removed from the knowledgebase). Item 212 can be performed such that the new product type is not deleted from the knowledgebase only if the new print product type is valid and free of errors, to prevent inappropriate new product types from being incorporated to the knowledgebase. Alternatively, in item 212, user input can determine whether to delete or maintain the preliminarily added new product type. The user can be given the option to add a potentially erroneous new product type after the user has been provided feedback about the problems with the new product type they created. Thus, for example, the user may decide that the errors discussed in the feedback are minor and may decide to add the new product type despite being provided feedback relating to potential problems with the new product type.

Thus, as shown above, the embodiments herein provide a novel application of semantic web technologies in the support of the definition of new print product types that are used by any common classifier.

Many computerized devices are discussed above. Computerized devices that include chip-based central processing units (CPU's), input/output devices (including graphic user interfaces (GUI), memories, comparators, processors, etc. are well-known and readily available devices produced by manufactures such as International Business Machines Corporation, Armonk N.Y., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein.

All foregoing embodiments are specifically applicable to electrostatographic and/or xerographic machines and/or processes as well as to software programs stored on the electronic memory (computer usable data carrier) 106 and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
   maintaining a knowledgebase having a set of existing product classes into which defined product descriptions are classified, said existing product classes each comprising existing class conditions, said existing class conditions comprising templates for creating, from said product descriptions, workflows of processes required to produce a product instance;
   receiving, as input, a new product class, said new product class being different from said existing product classes and having new product class conditions;
   mapping a representation of said new product class conditions to be semantically consistent with a representation of said existing class conditions;
   evaluating said new product class to produce user feedback, said evaluating comprising:
      identifying ones of said existing product classes that overlap said new product class,
      identifying said new product class conditions that are inconsistent with any of said existing class conditions within an associated existing product class,
      identifying mutually exclusive conditions within said new product class conditions,
      validating said new product class conditions with respect to capabilities of products, services and devices that will be used to physically produce said new product class, and
      identifying whether said new product class is valid and free of errors;
   outputting said user feedback; and
   incorporating said new product class into said knowledgebase as one of said existing product classes only if said new product class is valid and free of errors.

2. The method according to claim 1, said method further comprising when said existing product classes overlap said new product class, requesting input from said user regarding which overlapping product class has precedence.

3. The method according to claim 1, said receiving of said new product class comprising restricting said new product class conditions to a predefined vocabulary.

4. The method according to claim 1, said existing product classes and said new product class comprising different types of printed products and said product instance being a printed product produced by a print shop.

5. The method according to claim 1, said product descriptions being classified within said existing product classes based on semantic matches between said product descriptions and said existing class conditions.

6. A method comprising:
maintaining a knowledgebase having a set of existing print product classes into which defined print product descriptions are classified, said existing print product classes each comprising existing class conditions, said existing class conditions comprising templates for creating, from said defined print product descriptions, workflows of processes required to produce a printed product instance;
receiving, as input, a new print product class, said new product class being different from said existing print product classes and having new print product class conditions;
mapping a representation of said new print product class conditions to be semantically consistent with a representation of said existing class conditions;
evaluating said new print product class to produce user feedback, said evaluating comprising:
identifying ones of said existing print product classes that overlap said new print product class,
identifying said new print product class conditions that are inconsistent with any of said existing class conditions within an associated existing print product class,
identifying mutually exclusive conditions within said new print product class conditions,
validating said new print product class conditions with respect to capabilities of print products, services and devices that will be used to physically produce said new print product class, and
identifying whether said new print product class is valid and free of errors;
outputting said user feedback; and
incorporating said new print product class into said knowledgebase as one of said existing print product classes only if said new print product class is valid and free of errors.

7. The method according to claim 6, said method further comprising, when said existing print product classes overlap said new print product class, requesting input from said user regarding which overlapping print product class has precedence.

8. The method according to claim 6, said receiving of said new print product class comprising restricting said new print product class conditions to a predefined vocabulary.

9. The method according to claim 6, said existing print product classes and said new print product class comprising different types of printed products and said printed product being produced by a print shop.

10. The method according to claim 6, said print product descriptions being classified within said existing print product classes based on semantic matches between said print product descriptions and said existing class conditions.

11. A system comprising:
a processor;
a storage device operatively connected to said processor, said storage device maintaining a knowledgebase having a set of existing product classes into which product descriptions are classified, said existing product classes each comprising existing class conditions, said existing class conditions comprising templates for creating, from said product descriptions, workflows of processes required to produce a product instance;
a graphic user interface operatively connected to said processor, said graphic user interface receiving, as input from a user, a new product class, said new product class being different from said existing product classes and having new product class conditions;
a mapper operatively connected to said processor, said mapper mapping a representation of said new product class conditions to be semantically consistent with a representation of said existing class conditions; and
an evaluator operatively connected to said processor, said evaluator evaluating said new product class to produce user feedback, said evaluating comprising
identifying ones of said existing product classes that overlap said new product class,
identifying said new product class conditions that are inconsistent with any of said existing class conditions within an associated existing product class,
identifying mutually exclusive conditions within said new product class conditions,
validating said new product class conditions with respect to capabilities of products, services and devices that will be used to physically produce said new product class, and
identifying whether said new product class is valid and free of errors,
said graphic user interface further outputting said user feedback, and
said processor incorporating said new product class into said knowledgebase as one of said existing product classes only if said new product class is valid and free of errors.

12. The system according to claim 11, said graphic user interface further requesting input from said user regarding which overlapping product class has precedence, said existing product classes overlap said new product class.

13. The system according to claim 11, said graphic user interface further restricting said new product class conditions to a predefined vocabulary, upon receiving said new product class.

14. The system according to claim 11, said existing product classes and said new product class comprising different types of printed products and said product instance being a printed product produced by a print shop.

15. The system according to claim 11, said product descriptions are classified within said classes based on semantic matches between said product descriptions and said existing class conditions.

16. A printing apparatus comprising:
a printing device;
a processor operatively connected to said printing device;
a storage device operatively connected to said processor, said storage device maintaining a knowledgebase having a set of existing print product classes into which print product descriptions are classified, said existing print product classes each comprising existing class conditions, said existing class conditions comprising templates for creating, from said print product descriptions, workflows of processes required to produce a printed product instance;
a graphic user interface operatively connected to said processor, said graphic user interface receiving, as input from a user, a new print product class, said new print product class being different from said existing print product classes and having new print product class conditions;
a mapper operatively connected to said processor, said mapper mapping a representation of said new print product class conditions to be semantically consistent with a representation of said existing class conditions; and an evaluator operatively connected to said processor, said evaluator evaluating said new print product class to produce user feedback, said evaluating comprising:

identifying ones of said existing print product classes that overlap said new print product class, identifying said new print product class conditions that are inconsistent with any of said existing class conditions within an associated existing print product class, identifying mutually exclusive conditions within said new print product class conditions, validating said new print product class conditions with respect to capabilities of print products, services and devices that will be used to physically produce said new print product class, and identifying whether said new print product class is valid and free of errors, said graphic user interface further outputting said user feedback, and said processor incorporating said new print product class into said knowledgebase as one of said existing print product classes only if said new print product class is valid and free of errors.

17. The printing apparatus according to claim 16, said graphic user interface further requesting input from said user regarding which overlapping print product class has precedence, when said existing print product classes overlap said new print product class.

18. The printing apparatus according to claim 16, said graphic user interface further restricting said new print product class conditions to a predefined vocabulary, upon receiving said new print product class.

19. The printing apparatus according to claim 16, said existing print product classes and said new print product class comprising different types of printed products to be produced by said printing apparatus.

20. The printing apparatus according to claim 16, wherein said printing device comprises one of an electrostatographic and xerographic apparatus.

* * * * *